United States Patent [19]
van der Aa et al.

[11] 3,835,714
[45] Sept. 17, 1974

[54] DEVICE COMPRISING A LIQUID-SUPPORTED ROLLING DIAPHRAGM SEAL

[75] Inventors: Herman Henricus Maria van der Aa; Robby Van Giessel; Gregorius Theodorus Maria Neelen, all of Emmasingel, Eindhoven, Netherlands

[73] Assignee: U.S. Philips Corporation, New York, N.Y.

[22] Filed: Apr. 13, 1972

[21] Appl. No.: 243,661

[30] Foreign Application Priority Data
Apr. 21, 1971 Netherlands.......................... 715348

[52] U.S. Cl.................... 74/18.2, 92/98 D, 277/165
[51] Int. Cl............................................ F16j 15/52
[58] Field of Search ......... 74/18.2, 18; 92/98 D, 84; 277/165

[56] References Cited
UNITED STATES PATENTS

| | | | |
|---|---|---|---|
| 2,857,184 | 10/1958 | Mancusi, Jr. ........................ | 277/165 |
| 3,057,630 | 10/1962 | Sneed .................................. | 277/165 |
| 3,549,154 | 12/1970 | Jones................................... | 277/165 |
| 3,601,417 | 8/1971 | Kufstein.............................. | 277/165 |
| 3,620,652 | 11/1971 | Jaspers et al. ................... | 74/18.2 X |

FOREIGN PATENTS OR APPLICATIONS

| 713,848 | 7/1965 | Canada............................... | 74/18.2 |
|---|---|---|---|

Primary Examiner—Allan D. Herrmann
Attorney, Agent, or Firm—Frank R. Trifari

[57] ABSTRACT

A device comprising a liquid-supported rolling diaphragm seal between two relatively reciprocating elements, further including a flexible metal sleeve between the two elements, and a clamping ring urging the sleeve radially against one of said elements.

4 Claims, 1 Drawing Figure

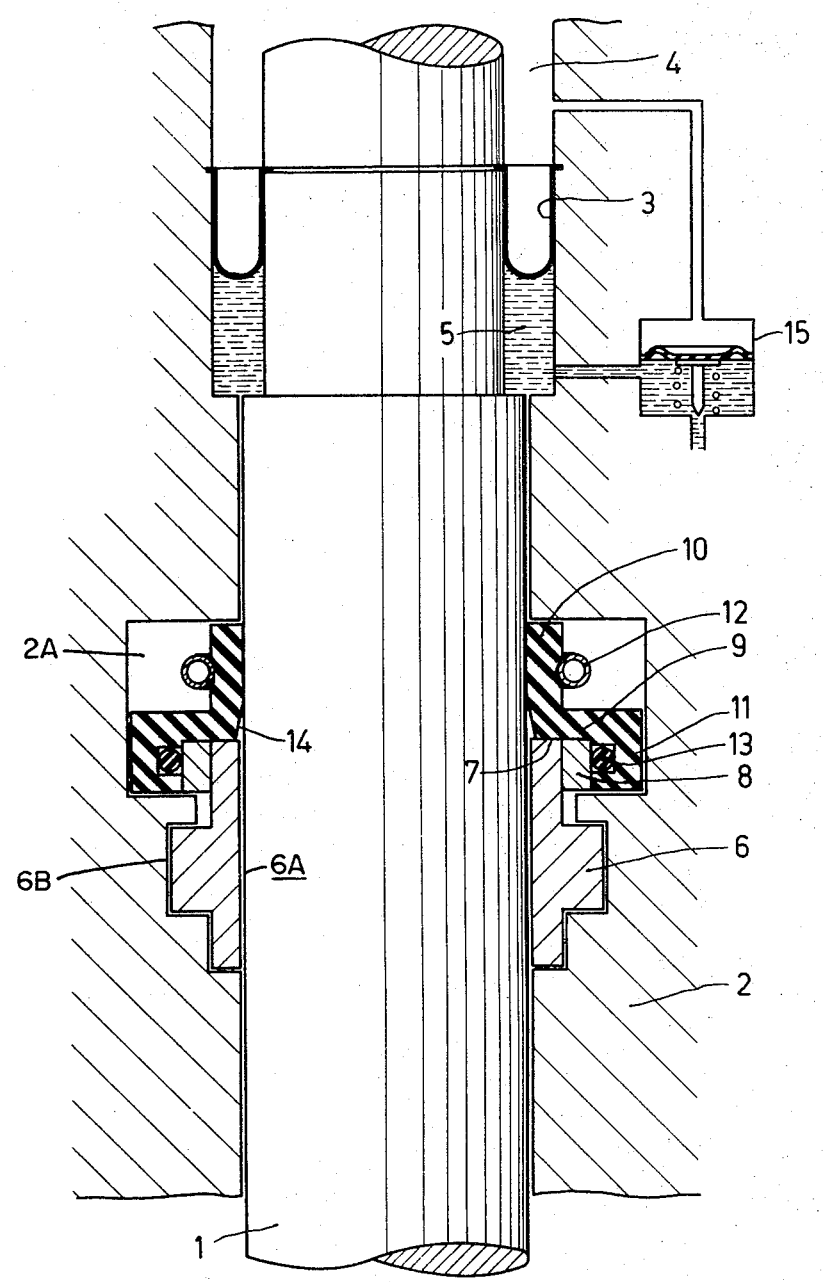

DEVICE COMPRISING A LIQUID-SUPPORTED ROLLING DIAPHRAGM SEAL

The invention relates to a device which comprises a liquid-supported rolling diaphragm seal between two coaxially arranged relatively reciprocating elements. One of the elements supports an annular metal sleeve which engages the other element with its cylindrical surface remote from said element and in which pressure means influence the other surface of the sleeve in a zone present on that side of the sleeve which faces the rolling diaphragm, said means exerting forces on the sleeve in the direction of the other element.

A device of the type to which the present invention relates is known from the U.S. Pat. No. 3,241,379. In this device the rolling diaphragm is present between a piston and the cylinder cooperating therewith. The rolling diaphragm separates a working space from a space which is filled with supporting liquid. By means of a so-called pumping ring, liquid is supplied to the said space, and a control device is present which ensures that sufficient liquid is always removed from said space that a substantially constant pressure differential is maintained across the rolling diaphragm.

The pumping ring which is described in greater detail in the U.S. Pat. No. 3,149,846 is constituted by a metal sleeve whose cylindrical inner side engages the piston rod and which is further incorporated in an annulr recess in the surrounding housing in such manner that the sleeve cannot move axially. Furthermore, on that side of the sleeve to which the liquid is pumped, pressure means act upon the outer surface and force said side of the sleeve against the piston rod. In the known pumping ring, the pressure means are constituted by a number of ring-supported springs which exhibits the drawbacks of occupying comparatively much space, as a result of which the height of the structure is enlarged, and being furthermore rather expensive in manufacture.

It is the object of the invention to provide a device in which the said drawbacks are avoided; the invention is characterized in that the pressure means are constituted by a metal ring which engages the relevant zone and in the dismantled condition shows a difference in diameter with the diameter of the relevant zone of the sleeve in such manner that the ring forces the sleeve against the other element.

A clamping or pressure ring used in accordance with the invention is cheap to manufacture due to its simple machining and does not project in the axial direction beyond the pumping ring so that in this direction no extra space is required and the height of the structure is minimized.

If the material of said ring is loaded to beyond the yield point during assembly on the pumping sleeve, a maximum elastic elongation is introduced in the ring. This is favourable because as a result of this any detrition of the sleeve can be compensated. It is therefore favourable to use a material for the ring having a large elastic elongation, for example, brass.

In the drive according to the invention, the sleeve serves both to pump liquid to the space below the rolling diaphragm and to seal said space. High requirements are imposed upon this latter function in particular in the stationary condition of the elements. The sleeve is manufactured from metal which is unfavourable for a hermetic seal because scratches and other unevenesses constitute permanent leakage paths.

In order to avoid this, in a further embodiment of the device according to the invention the side of the sleeve which supports the ring comprises an annular sealing cap of a flexible material which engages with a first part having a cylindrical surface the other element and engages with a second part having likewise a cylindrical surface, the ring or the sleeve, the cylindrical surfaces having different diameters and the first part, at the area of the change in diameter, showing a conically extending bevel.

Since the flexible sealing cap can better adapt to the surface of the moving element also in the stationary condition, a good hermetic seal is ensured in this manner. When the elements are moving, the liquid in the pumping ring can pass the sealing cap substantially without hindrance. The invention will be described in greater detail with reference to the drawing, which shows an elevation view in section of the invention.

DESCRIPTION OF THE PREFERRED EMBODIMENT

Reference numeral 1 in the drawing denotes a rod which reciprocates in a surrounding housing 2. Between the rod and housing are defined a first annular chamber 4, 5, and axially spaced therefrom a second annular chamber 2A, which is a recess in the housing. A rolling diaphragm 3 which on one side bounds a space 4 to be sealed and on the other hand bounds a space 5 filled with supporting liquid is present as a seal between the rod or piston and the housing, or cylinder elements.

Around the rod 1 is provided a metal sleeve 6 whose inner surface 6A engages said rod and outer surface 6B engages the housing; the sleeve is incorporated in the housing 2 in such manner that axial movement is not possible. On the side 7 of the sleeve 6 facing the rolling diaphragm 3 is provided a clamping ring 8 which in the dismantled condition has a smaller inner diameter than the outer diameter of the side 7. A sealing cap 9 of a flexible material is slid over said side 7. Said sealing cap 9 consists of a part 10 or second portion of a smaller diameter which engages the rod 1 and a part 11 or first portion of a larger diameter which engages the clamping ring. In order to promote a good pressure of the part 10 against the rod 1, an annular spring 12 acts on the outside of said part. An O-ring 13 for improving the seal is furthermore provided between the clamping ring 8 and the part 11 of the sealing cap. The annular spring 12 and the O-ring 13 may be omitted in certain circumstances. At the area of the transition of part 10 and part 11, is a middle portion formed adjacent the inner surface of part 10, which comprises a conical run-in member 14.

By the one-sided pressure of sleeve 6 by means of clamping ring 8, liquid present on the rod 1 will be pumped upwards during the upward movement of the rod 1. During the downward stroke of the rod 1, no hydrodynamic pumping effect occurs between the sleeve 6 and the rod 1, and the sleeve 6 operates as it were as a check valve which prevents flow of liquid downwards. As shown in the drawing, such a clamping ring does not enlarge the height of the structure. In the dismantled condition, the inner diameter of the clamping ring is smaller than that of the sleeve so that after assembly the clamping ring presses the sleeve against the rod, this ring is thus resilient in that it is expanded during assembly, and because of its tendency to return, it presses the sleeve inward.

In order to ensure a good seal also in the stationary condition, a sealing cap 9 is furthermore present which is manufactured from a more flexible material than the sleeve 6 so as to better adapt to the surface of the rod 1. The oil pumped by the sleeve 6 can pass said sealing cap substantially without hindrance also as a result of the run-in member 14, while oil from the space 5 substantially has no opportunity of flowing downwards along the sealing cap.

The device furthermore comprises a control device 15 which ensures that the liquid pumped to the space 5 by the sleeve 6 can be removed again from said space in such manner, that a constant pressure differential across the rolling diaphragm 3 is always maintained.

It is to be noted that, although FIG. 1 shows a device in which the sleeve 6 with accessories is incorporated in the stationary housing, it is also possible in certain circumstances to incorporate the sleeve 6 in the rod. The clamping ring 8 then influences the inner surface of the sleeve in which case the outer diameter of the ring 8 in the dismantled condition is larger than the inner diameter of the sleeve. In this manner, after assembly, the sleeve is forced against the surface of the housing by the ring 8.

What is claimed is:

1. Apparatus comprising a pair of coaxially disposed piston and cylinder elements, one being reciprocally movable relative to the other, with first and second axially spaced annular chambers defined between said elements, a rolling diaphragm seal extending between and secured to said elements, a metal sleeve situated in said second annular space with inner and outer surfaces of the sleeve facing the piston and cylinder elements respectively, pressure means intermediate one of said surfaces and the adjacent element contacting said sleeve in a zone thereon and applying radial forces urging the sleeve toward the other element, said pressure means being a resilient ring; said apparatus further comprising an annular sealing cap having a first portion radially outward of said ring and applying force radially inward against said ring, and a second portion axially-spaced from the first which contacts and surrounds said piston, and a middle portion axially intermediate said first and second portions that is radially outward of and does not contact the piston.

2. Apparatus according to claim 1 further comprising a resilient ring acting radially inward on said second portion of said sealing cap.

3. Apparatus according to claim 1 wherein the part of said middle portion adjacent the piston is conical and spaced from said piston.

4. In an assembly of mating and reciprocally movable piston and cylinder elements, the improvement in combination therewith of means for providing a seal and a fluid pump therebetween situated in first and second axially spaced apart annular chambers therebetween, comprising a rolling diaphragm seal extending between and secured to said elements in said first chamber, and in said second chamber a metal sleeve with first and second ends, the first end being remote from said first chamber, radially outward of and contacting said second end of the sleeve a metal clamping ring urging said sleeve inward against said piston, an annular sealing cap comprising a first portion radially outward of and contacting said clamping ring, a second portion axially spaced from the first portion toward said first chamber, and surrounding and contacting said piston, and a middle portion intermediate said first and second portions, the middle portion surrounding said piston and defining therewith a conical annular space having its greatest diameter diminish in the direction toward said first chamber.

* * * * *

PO-1050
(5/69)

UNITED STATES PATENT OFFICE
CERTIFICATE OF CORRECTION

Patent No. 3,835,714     Dated September 17, 1974

Inventor(s) HERMAN HENRICUS MARIA VAN DER AA ET AL

It is certified that error appears in the above-identified patent and that said Letters Patent are hereby corrected as shown below:

In the heading: "Foreign Application Priority Data"

the Netherlands application No. should be --7105348--

Signed and sealed this 31st day of December 1974.

(SEAL)
Attest:

McCOY M. GIBSON JR.
Attesting Officer

C. MARSHALL DANN
Commissioner of Patents